United States Patent [19]
Yamamoto

[11] Patent Number: 5,088,225
[45] Date of Patent: Feb. 18, 1992

[54] REEL LOCKING DEVICE

[75] Inventor: Shigeru Yamamoto, Tokyo, Japan

[73] Assignee: Daiwa Seiko, Inc., Tokyo, Japan

[21] Appl. No.: 495,997

[22] Filed: Mar. 20, 1990

[30] Foreign Application Priority Data

Mar. 29, 1989 [JP] Japan .................................. 1-79378

[51] Int. Cl.⁵ .............................................. A01K 87/00
[52] U.S. Cl. ................................................ 43/22; 43/23
[58] Field of Search ................................. 43/22, 23

[56] References Cited

U.S. PATENT DOCUMENTS

| | | | |
|---|---|---|---|
| 2,325,457 | 7/1943 | Wilson | 43/22 |
| 2,592,878 | 4/1952 | Esposito | 43/22 |
| 2,667,713 | 2/1954 | Stephens | 43/22 |
| 2,793,458 | 5/1957 | Stephens | 43/22 |
| 3,047,974 | 8/1962 | Stephens | 43/22 |
| 3,123,931 | 3/1964 | Stephens | 43/22 |
| 3,364,612 | 1/1968 | Holahan | 43/22 |
| 4,535,561 | 8/1985 | Hlava | 43/22 |
| 4,649,661 | 3/1987 | Myojo | 43/22 |
| 4,702,032 | 10/1987 | Ohmura | 43/23 |
| 4,860,484 | 8/1989 | Green | 43/22 |

Primary Examiner—Kurt Rowan
Attorney, Agent, or Firm—Kalish & Gilster

[57] ABSTRACT

The present invention relates to an improved reel locking device wherein a first hood and second hood for locking the reel leg are positioned vis-a-vis a specified distance apart in the axial direction of the reel seat body and construction enables movement along the reel seat body of the first hood by rotation of a lock ring. The present invention is constructed such that the first hood has an extension extending to the far end of the second hood and rotation of the lock ring enables movement of the extension along the reel seat body. Therefore, in the present invention, when the lock ring which is positioned behind the rear hood of the reel seat body is rotated, the extension in the forward hood which extends to the far end of the rear hood is moved along the reel seat body, thereby moving the first hood.

10 Claims, 6 Drawing Sheets

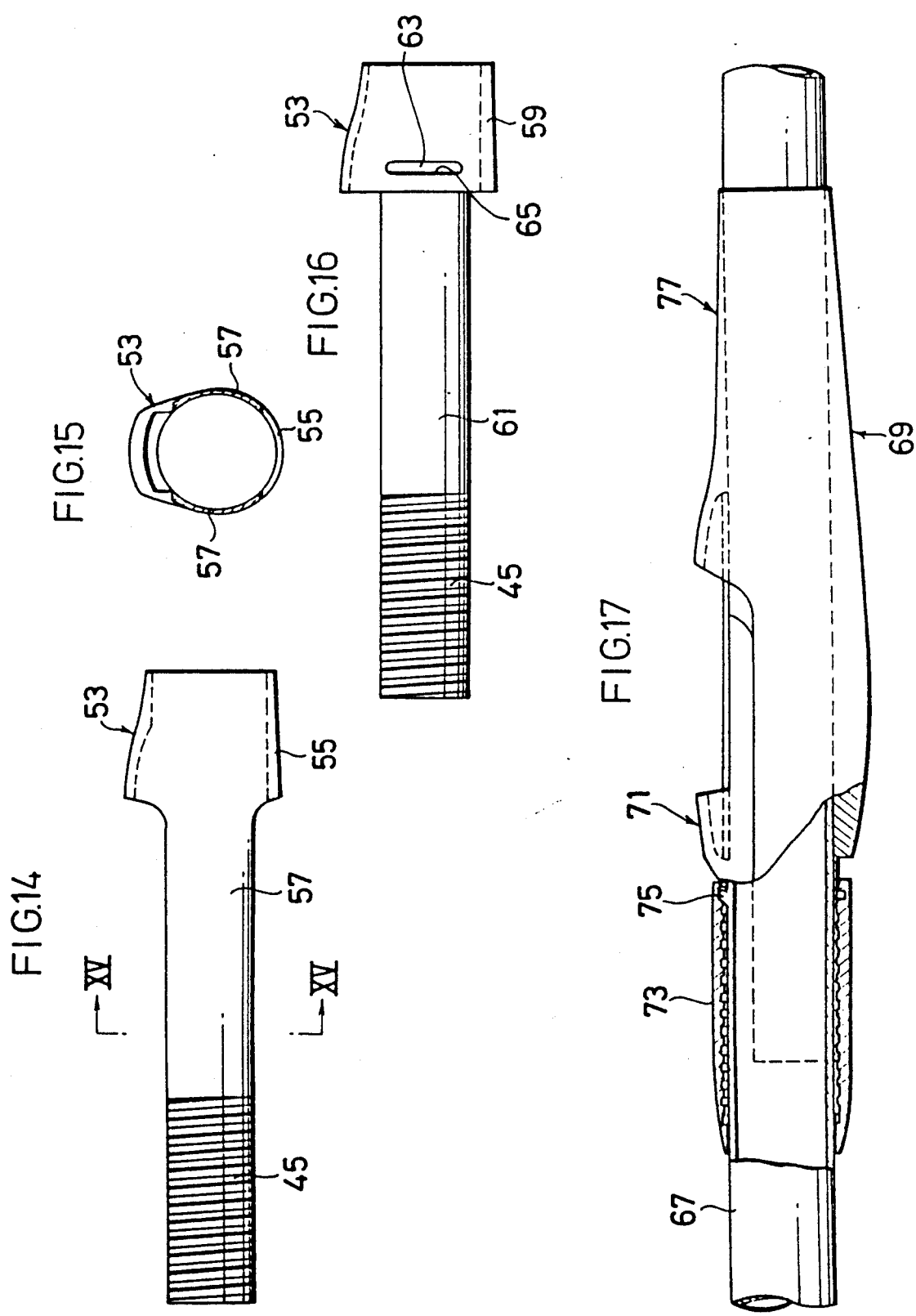

REEL LOCKING DEVICE

BACKGROUND OF THE INVENTION

1. Field of the Invention

The present invention relates to a reel locking device for locking the fishing reel onto the fishing rod.

2. Description of the Prior Art

Generally, a reel locking device such as that disclosed in, for example, Japanese Utility Model Application Laid-open Print No. 57-27245 is used to lock the fishing reel onto the fishing rod.

FIG. 20 shows the reel locking device disclosed in the above laid-open print, in which device the reel leg is locked onto a reel seat body 11 by mounting the reel leg of the fishing reel which is not illustrated herein on the reel seat body 11 between a front hood (first hood) 13 and a rear hood (second hood) 15 which are positioned vis-a-vis a specified distance apart along the length of the shaft of the reel seat body 11 and then moving the front hood 13 along the reel seat body 11 toward the rear hood 15 by rotating a lock ring 19 which mates with an external thread section 17 of the reel seat body 11.

A fishing rod employing a conventional reel locking device normally uses the following two operations for fishing. One is fishing in which a boat rod is used and the front of the reel seat body is grasped. In this case, the tip of the fishing rod is raised, the reel is positioned immediately below the hands and fastened, and the front grip is principally used during fishing operations. The other is fishing in which the fishing rod is supported in the armpit of the angler as in squid fishing in Japan and the underside or the rear of the reel seat body is grasped. The rod tip is lowered while still supported in the armpit, the reel is fastened and locked at the front of the reel seat body, and the underside or the rear of the reel seat body is grasped during fishing operations.

An explanation of these two fishing operations follows. FIG. 21 shows an example of the former type of fishing. When attaching a large size fishing reel 4 such as a double bearing reel to a fishing rod 1, a reel leg 5 is locked by lowering a base 2 of the fishing rod 1 and raising a rod tip 3, inserting the reel leg 5 in the rear hood 15 near the base of the fishing rod 1, and rotating the lock ring 19 which is positioned in front of the front hood 13, thereby moving the front hood 13 toward the rear hood 15.

However, with the conventional reel locking device, when rotating the lock ring 19 as shown in FIG. 21, there is a problem that the fishing reel 4 is a hindrance to the hands and it is extremely difficult to rotate the lock ring 19.

Also, when a fish is caught on the fishing rod 1 and pumping operations are effected, since the lock ring 19 is located near the grip in front of the fishing reel 4, there is a problem that the lock ring 19 is a hindrance to the hands and it is difficult to grasp the grip tightly.

On the other hand, in the latter type of fishing, as shown in FIG. 22, when attaching a large size fishing reel 4 such as a double bearing reel to the fishing rod 1, the reel leg 5 is locked with the rod tip 3 of the fishing rod 1 lowered while the base 2 of the fishing rod 1 is supported in the armpit 7 of an angular 6, inserting the reel leg 5 into the rear hood 15 on the side of the tip of the fishing rod 1, and rotating the lock ring 19 which is positioned in front of the front hood 13, thereby moving the front hood 13 toward the rear hood 15.

However, with the conventional reel locking device, since the lock ring 19 rubs against the inner side of the left arm of the angler 6 (on which side the reel is gripped) as shown in FIG. 22, pain is caused to the angler 6.

SUMMARY OF THE INVENTION

An object of the present invention is to provide a reel locking device which enables easy execution of the lock ring rotation and fishing rod pumping operations to obviate the above-mentioned disadvantages.

Another object of the present invention is to provide a reel locking device with which the reel leg can be locked easily.

A further object of the present invention is to provide a reel locking device with which the movable hood can be easily grasped and the tightening operation when affixing the reel and fishing rod pumping operations can be easily carried out.

A still further object of the present invention is to provide a reel locking device which enables extremely easy execution of the lock ring rotation operation without the fishing reel causing hindrance to the hand by positioning the lock ring behind the immovable hood of the reel seat body.

A yet further object of the present invention is to provide a reel locking device which enables extremely easy execution of pumping operations without the fishing reel causing hindrance to the hand by positioning the lock ring behind the immovable hood of the reel seat body.

A yet further object of the present invention is to provide a reel locking device which enables easy gripping by providing the movable hood with an extension.

A yet further object of the present invention is to provide a reel locking device where the lock ring does not hinder the arm gripping the fishing reel during fishing operations in which the fishing rod is supported in the armpit of the angler.

The characteristic of the present invention lies in enabling easy execution of lock ring rotation and fishing rod pumping operations through the construction in which the extensions which are formed to extend from the movable hood toward the far end of the immovable hood are moved along the reel seat body by rotation of the lock ring which is positioned behind the immovable hood of the reel seat body, so that rotation of the lock ring which is positioned behind the immovable hood of the reel seat body moves the movable hood and the extensions which are formed to extend from the movable hood toward the far end of the immovable hood along the reel seat body.

It is further characteristic of the present invention that the lock ring is formed coaxially and outward of the extension to thereby form a case having a length greater than a diameter of the case.

BRIEF DESCRIPTION OF THE DRAWINGS

FIG. 14 is a front view showing the front hood of FIG.

FIG. 15 is a transverse sectional view taken on line XIII—XIII of FIG. 14.

FIG. 16 is a front view of another embodiment of the front hood of the reel locking device of the present invention.

FIG. 17 is a front view of a further embodiment of the reel locking device of the present invention.

DESCRIPTION OF THE PREFERRED EMBODIMENT OF THE INVENTION

Figure 1:
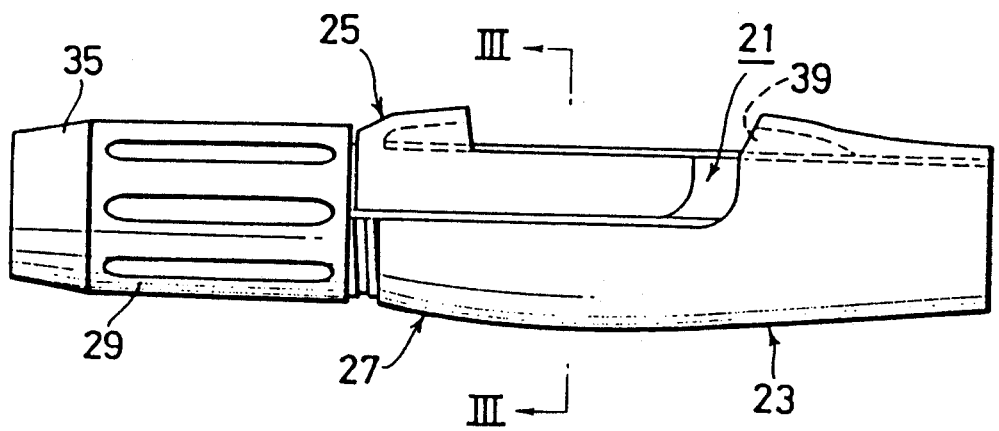
FIG. 1 is a front view of an embodiment of a reel locking device of the present invention.
Figure 2:
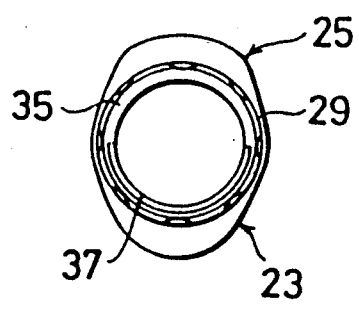
FIG. 2 is a side view of FIG. 1.
Figure 3:
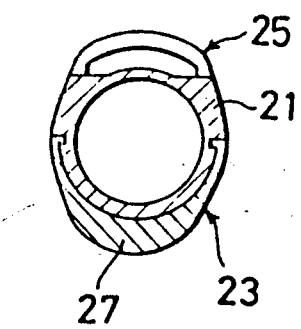
FIG. 3 is a transverse sectional view taken on line III—III of FIG. 1.

The details of the invention will be described with reference to the embodiments shown in the drawings.

An embodiment of the reel locking device of the present invention is shown in FIGS. 1 to 7 wherein reference numeral 21 shows the reel seat body of the fishing rod onto which the leg of the fishing reel is locked.

On the length of the shaft of the reel seat body 21, a front hood (first hood) 23 and a rear hood (second hood) 25 for locking the reel leg are positioned vis-a-vis a specified distance apart as shown in FIG. 1.

However, in this embodiment, an extension 27 which extends to the far end of the rear hood 25 is formed in the front hood 23.

And a lock ring 29 is positioned behind the rear hood 25 of the reel seat body 21 and is constructed to enable the extension 27 of the front hood 23 to be moved along the reel seat body 21 with the rotation of the lock ring 29.

Figure 4:
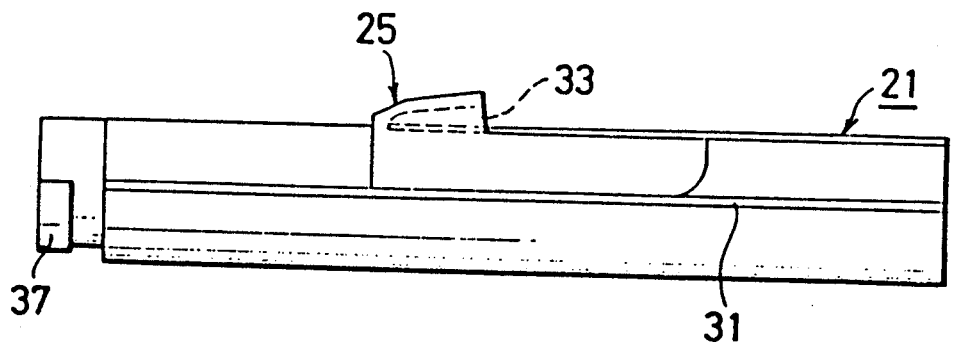
FIG. 4 is a front view of the reel seat body of FIG. 1.
Figure 5:
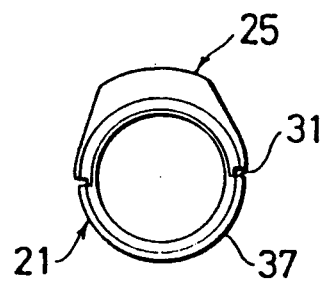
FIG. 5 is a side view of FIG. 4.

FIGS. 4 and 5 show the detail of the reel seat body 21 which forms a cylinder, in the axial direction of the exterior of which is formed a groove 31 above which is constructed an integral rear hood 25 having a reel leg insertion section 33.

And in the end of the base of the reel seat body 21 is constructed a fastening projection 37 to retain a stopper member 35.

Figure 7:
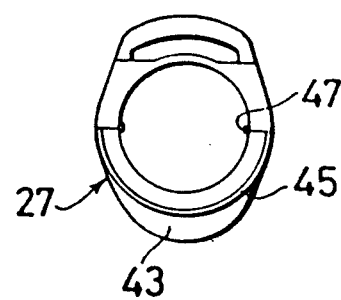
FIG. 7 is a side view of FIG. 6.
Figure 6:
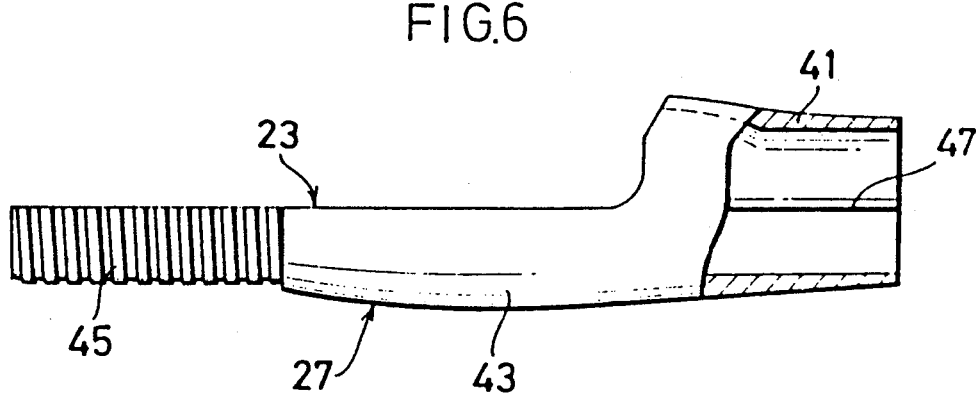
FIG. 6 is a front view of the front hood (first hood) of FIG. 1.

FIGS. 6 and 7 show the detail of the front hood 23 which is a principal part comprising a cylinder 41 which forms a reel leg insertion section 39 in the space between the front hood 23 and the inserted reel seat body 21, and an extension 27 which extends from the cylinder 41 to the far end of the rear hood 25.

In this embodiment the cylinder 41 and the extension 27 are constructed from, for example, laminated high strength fiber (textiles) which have been immersed in synthetic resin (for example, epoxy resin), and the semi-circular extension 27 swells outward to form a grip 43.

And behind the extension 27 is constructed an external thread 45 which mates with the internal thread formed in the inner surface of the lock ring 29.

And on the cylinder 41 of the front hood 23 is constructed a fastening projection 47 which is engaged with the groove 31 in the reel seat body 21 and prevents rotation of the front hood 23.

The reel locking device constructed as mentioned above is used by attaching the cylinder 41 of the front hood 23 to the front of the reel seat body 21, attaching the lock ring 29 to the rear of the reel seat body 21, fitting the lock ring 29 onto the external thread 45 of the extension 27 of the front hood 23 by rotating the lock ring 29, and assembling by affixing the stopper member 35 to the base end of the reel seat body 21 which is then affixed to the rod.

Figure 8:
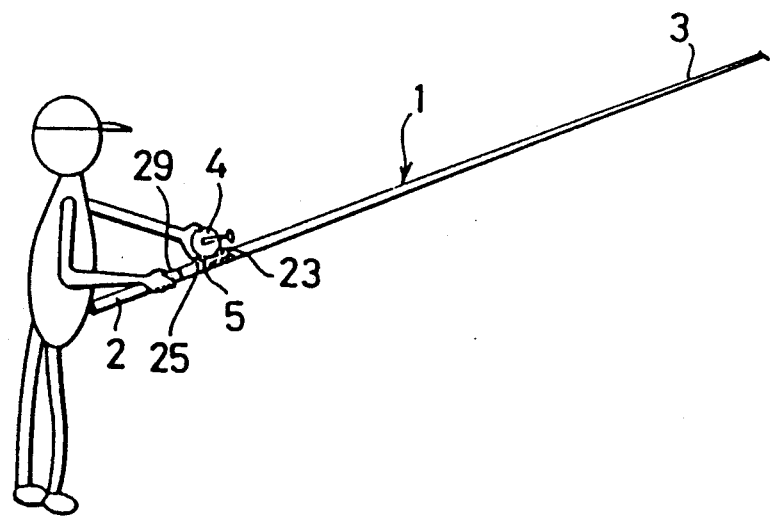
FIG. 8 is a perspective view showing the reel locking device of FIG. 1 fixed to the fishing rod.

And in the reel locking device constructed as mentioned above, a large size fishing reel such as a double bearing reel is affixed to the reel locking device by lowering the base 2 of the fishing rod 1 and raising the rod tip 3 as shown in FIG. 8 and with the reel leg 5 inserted into the rear hood 25 near the base 2 of the fishing rod 1, rotating the lock ring 29 which is positioned behind the rear hood 25, thereby moving the front hood 23 toward the rear hood 25 and locking the reel leg 5.

In the reel locking device constructed as mentioned above, the front hood 23 has an extension 27 extending to the far end of the rear hood 25 and is constructed to enable movement of the extension 27 along the reel seat body 21 by rotation of the lock ring 29 which is positioned behind the rear hood 25 of the reel seat body 21. Therefore, when the lock ring 29 which is positioned behind the rear hood 25 of the reel seat body 21 is rotated, the extension 27 of the front hood 23 which extends to the far end of the rear hood 25 is moved along the reel seat body I, thereby moving the front hood 23, so the rotation of the lock ring 29 and pumping operations of the fishing rod can be executed easily. In short, in the reel locking device constructed as mentioned above, since the lock ring 29 is positioned behind the rear hood 25 of the reel seat body 21, the fishing reel 4 is no longer a hindrance to the hand when rotating the lock ring 29, and the lock ring 29 can be rotated extremely easily.

Also, when a fish is caught and pumping operations are carried out, since the lock ring 29 is positioned behind the rear hood 25 of the reel seat body 21, the lock ring 29 no longer hinders the hand and pumping operations can be effected extremely easily.

Further, in the reel locking device constructed as mentioned above, at the very least the extension section 27 of the front hood 23 is constructed to have elastic deformation provided by synthetic resin, so the elastic deformation of the extension section 27 enables the reel leg to be fastened more tightly.

Also, in the reel locking device constructed as mentioned above, gripping is easy since the grip 43 is constructed with the extension 27 of the front hood 2 swelled outward.

Figure 9:
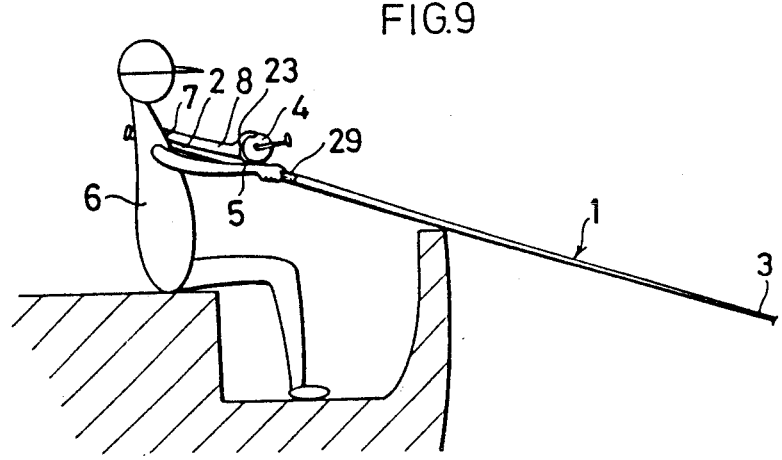
FIG. 9 is also a perspective view showing the reel locking device of FIG. 1 fixed to the fishing rod.
Figure 10:
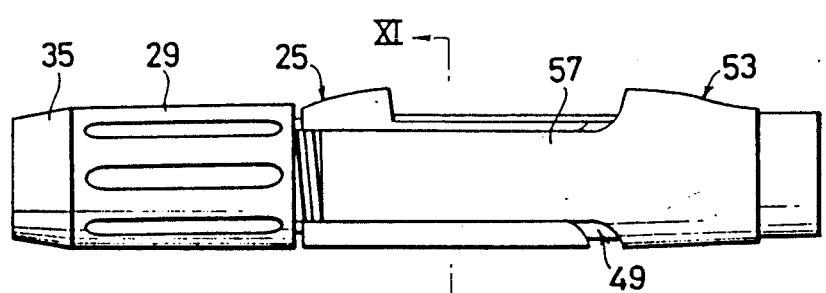
FIG. 10 is a front view of another embodiment of a reel locking device of the present invention.
Figure 11:
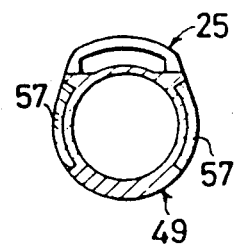
FIG. 11 is a transverse sectional view taken on line XI—XI of FIG. 10.

Further, the reel locking device of this embodiment can be used for example for fishing in which the fishing rod 1 is supported in the armpit 7 of the angler 6 as shown in FIG. 9. In this case, the rear hood 25 is positioned toward the rod tip and the reel leg 5 of the reel 4 is inserted into this rear hood 25. And when the lock ring 29 which is positioned toward the rod tip is rotated, the front hood 23 which is positioned toward the angler 6 is moved toward the fishing reel 4, locking the reel leg 5.

Thus, after affixing the fishing reel 4 to the fishing rod 1 as shown in FIG. 9, normal fishing operations can be carried out. In this case, the lock ring 29 which is positioned further forward toward the rod tip 3 than the fishing reel 4 does not hinder the left arm 8 gripping the fishing reel 4 as in conventional fishing (refer to FIG. 2). Therefore, the angler 6 can be devoted to fishing operations without being inconvenienced by the position of the lock ring 29.

As shown in FIGS. 8 and 9, in the reel locking device of the present invention, the front hood 23 and the rear hood 25 do not represent the front end and base end of the fishing rod 1, but the front and rear are determined according to the fishing operation.

Figure 12:
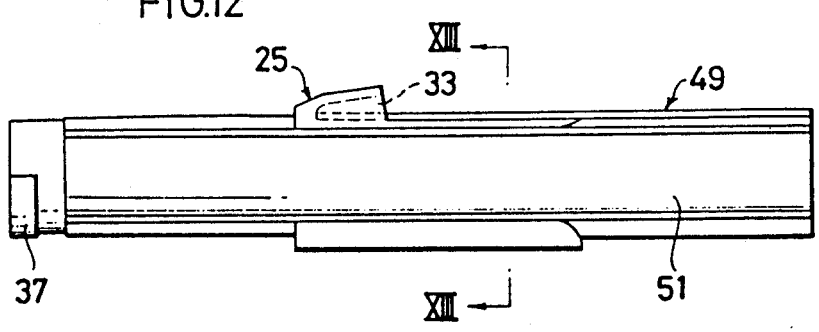
FIG. 12 is a front view showing the reel seat body of FIG. 10.
Figure 13:
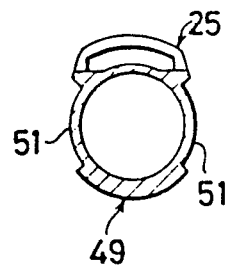
FIG. 13 is a transverse sectional view taken on line XV—XV of FIG. 10.

FIGS. 10 to 15 show other embodiments of the reel locking device of the present invention, in which drawings a mating groove 51 is formed in the longitudinal axial direction on opposing sides of the circumference of a reel seat body 49 as shown in FIGS. 12 and 13.

On the other hand, in a front hood 53 is constructed a pair of extensions 57 adjoining a cylinder 55 and which mate with the mating groove 51 of the above mentioned reel seat body 49 as shown in FIGS. 14 and 15.

In the reel locking device constructed as mentioned above, it is possible to obtain similar results to the embodiment shown in FIG. 1, but in the present embodiment the extensions 57 of the front hood 53 is designed to mate with the mating grooves 51 of the reel seat body 49, so the front hood 53 can be firmly supported by the reel seat body 49.

FIG. 16 shows a further embodiment of the reel locking device of the present invention, in which embodiment the front hood 53 shown in FIG. 14 consists of a cylinder 59 and the extension 61, and a projection 63 constructed in the extension 61 is retained in a groove 65 constructed in the cylinder 59 which is connected to the extension 61.

In the reel locking device constructed as mentioned above, it is possible to obtain similar results to the embodiment shown in FIG. 1, but in this embodiment the cylinder 59 and the extension 61 of the front hood 53 are constructed so as to be removable, so assembly and disassembly can be carried out easily.

FIG. 17 shows a further embodiment of the reel locking device of the present invention, in which embodiment a front hood 69, a rear hood 71 and a lock ring 73 are attached directly to a fishing rod 67, and the lock ring 73 controls movement in the axial direction of a fastening projection 75 which projects from the exterior of the rod In the reel locking device constructed as mentioned above, it is possible to obtain similar results to the embodiment shown in FIG. 1 but in this embodiment it is possible to supply the reel locking device at low cost since there is no need to install a separate reel seat Also, in this embodiment a cylinder 77 of the front hood 69 extends further forward, so gripping is extremely easy.

Figure 19:
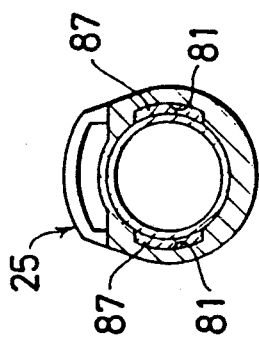
FIG. 19 is a transverse sectional view taken on line XIX—XIX of FIG. 18.
Figure 18:
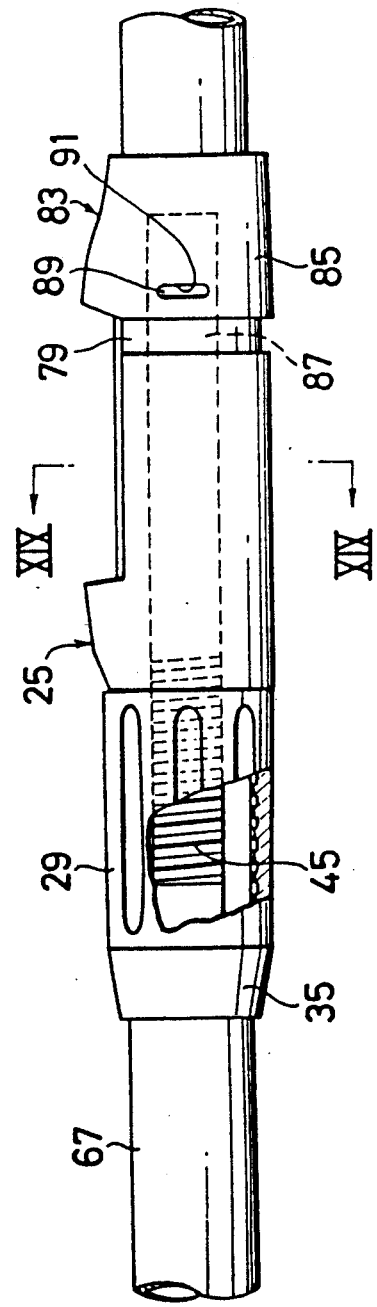
FIG. 18 is a front view of a further embodiment of the reel locking device of the present invention.
Figure 20:
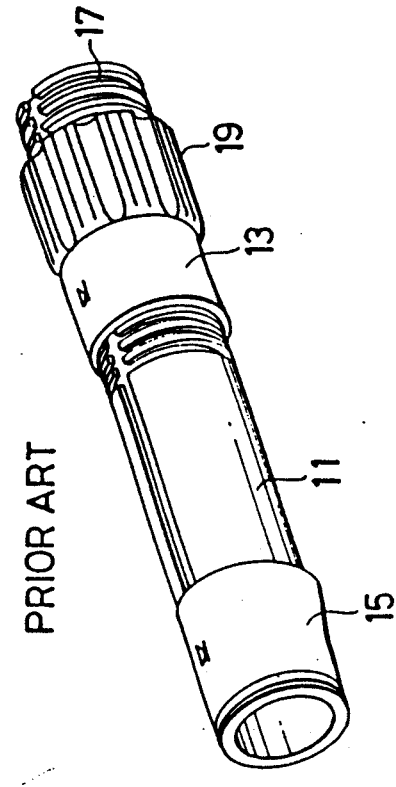
FIG. 20 is a perspective view of a conventional reel locking device.
Figure 21:
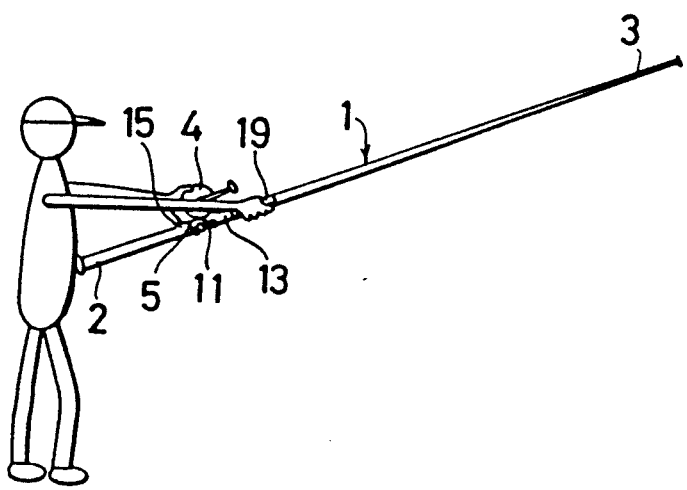
FIG. 21 is a perspective view showing a conventional reel locking device fixed to the fishing rod.
Figure 22:
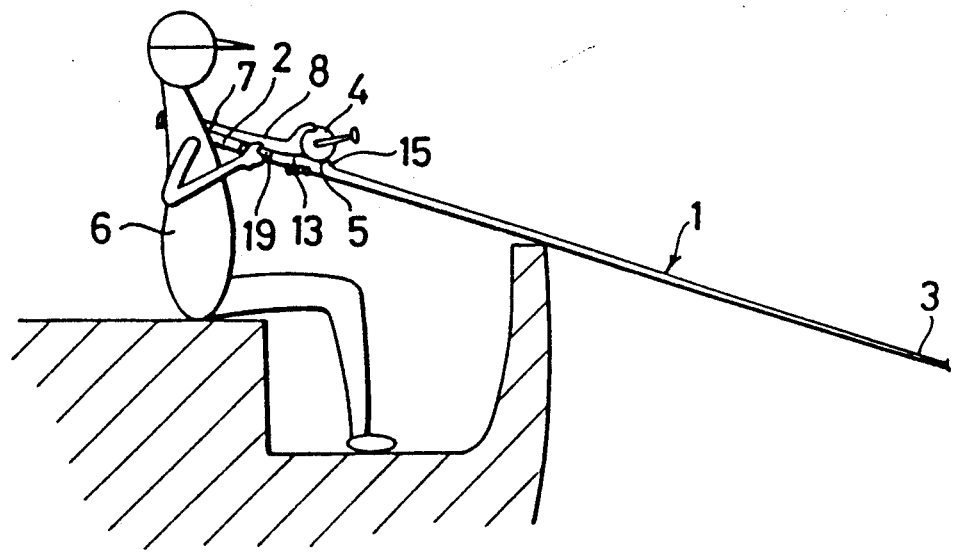
FIG. 22 is also a perspective view of a conventional reel locking device fixed to the fishing rod.

FIGS. 18 and 19 show a further example of the reel locking device of the present invention, in which embodiment mating grooves 81 are constructed in the axial longitudinal direction in opposing sides of the exterior of a reel seat body 79. On the other hand, the pair of extension sections 87 in a front hood 83 are constructed adjoining a cylinder 85 and are mated with the mating groove 81 of the reel seat body 79.

Further, in this embodiment, in the same way as shown in FIG. 16, the front hood 83 consists of the cylinder 85 and extensions 87, and projections 89 formed in the extensions 87 connect them by being retained into grooves 91 formed in the cylinder 85. Reference numeral 67 in the drawing indicates the butt section of the rod.

In the reel locking device constructed as mentioned above, it is possible to obtain similar results to the embodiment shown in FIG. 1, but in this embodiment the extensions 87 of the front hood 83 are mated with the mating groove 81 formed in the inside surface of the reel seat body 79, and the outside diameter of the front hood 83 is almost the same as that of the reel seat body 79, so as well as being extremely easy to hold, a simple design is obtained.

Further, in each of the above mentioned embodiments, the rear hoods 25 and 71 are formed of, for example, synthetic resin having metallic rings, thereby enabling a large size fishing reel to be supported firmly.

Also, in the above mentioned embodiments, examples are given in which the external thread 45 is formed in the extensions 27, 57 and 87 of the front hoods 23, 53, 69 and 83, but the present invention is not restricted to such embodiments, and construction is also possible in which for example the inside surface of the lock ring is provided with a groove with which the fastening projection of the extension is mated, and the front hood is moved with the rotation of the lock ring which is mounted onto the reel seat body.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A reel locking device wherein first and second hoods for locking a reel leg to a reel seat body are positioned vis-a-vis a specified distance part in the longitudinal axial direction of the reel seat body and the first hood is movably structured along the reel seat body by rotation of a lock ring, said device comprising an extension formed on the first hood to extend to the far end of the second hood and the lock ring disposed behind the second hood such that rotation thereof moves the extension along the reel seat body, and in which the rear of the extension is formed with an external thread which mates with an internal thread formed in the inside surface of the lock ring.

2. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood such that rotation thereof moves the extension along the reel seat body, and in which the extension is semicircular and swells outward to form a grip.

3. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood such that rotation thereof moves the extension along the reel seat body, and in which the first hood has the principal part made of a cylinder in which a space between the first hood and inserted reel seat body forms a reel leg insertion section, and the extension extends from the cylinder to the back of the second hood, and further in which the cylinder of the first hood is provided with a fastening projection to engage with a groove of the reel seat body to prevent rotation of said first hood.

4. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood such that rotation thereof moves the extension along the reel seat body, and in which the reel seat body has a mating groove formed in the longitudinal axial direction in both sides of the exterior thereof.

5. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood such that rotation thereof moves the extension along the reel seat body, and in which the first hood has a pair of extensions constructed vis-a-vis on an adjoining cylinder so as to mate with a mating groove of the reel seat body.

6. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood of said reel seat body such that rotation of the lock ring moves the extension along the reel seat body, and in which the first hood consists of the cylinder and the extension, the extension being formed with a projection which is retained in a groove formed in the cylinder.

7. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood of said reel seat body and rotated to move the extension along the reel seat body, and in which the reel seat body has a mating groove formed in the longitudinal axial direction in both sides of the inside surface, and the first hood has a pair of extensions formed vis-a-vis in the cylinder to mate with a mating groove of the reel seat body.

8. A reel locking device wherein first and second hoods for locking a reel to a reel seat body are positioned vis-a-vis a specified distance apart in the axial direction of the reel seat body and the first hood is movably structured along the reel seat body by rotation of a lock ring, said device comprising an extension formed on the first hood to extend to the far end of the second hood and the lock ring disposed behind the second hood of the reel seat body and rotated to move the extension along the reel seat body, wherein the first and second hoods for locking the reel leg to the reel seat body are positioned vis-a-vis a specified distance apart in the longitudinal axial direction along the rod, and are constructed to enable movement of the first hood along the rod by rotation of the lock ring, and wherein the lock ring is disposed behind the second hood on the rod to enable movement of the extension along the rod with the rotation of the lock ring, in which the lock ring has its movement in the longitudinal axial direction limited by means of a fastening projection which projects from the exterior of the rod.

9. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood such that rotation of the lock ring moves the extension along the reel seat body, and in which a fastening projection for retaining a stopper member is constructed in the end of a base of the reel seat body.

10. A reel locking device wherein first and second hoods for locking a reel leg to a reel seat body are positioned vis-a-vis a specified distance apart in the longitudinal axial direction of the reel seat body and the first hood is movably structured along the reel seat body by rotation of a lock ring, said device comprising an extension formed on the first hood to extend to the far end of the second hood and the lock ring disposed behind the second hood of said reel seat body such that rotation of the lock ring moves the extension along the reel seat body, the lock ring being formed coaxially and outward of the extension to thereby form a case having a longitudinal axis longer than a diameter of the case.

* * * * *

UNITED STATES PATENT AND TRADEMARK OFFICE
CERTIFICATE OF CORRECTION

PATENT NO. : 5,088,225

DATED : February 18, 1992

INVENTOR(S) : Shigeru Yamamoto

It is certified that error appears in the above-identified patent and that said Letters Patent is hereby corrected as shown below:

Col. 6, line 52, replace "part" with --apart--.

Signed and Sealed this

Twenty-seventh Day of April, 1993

Attest:

MICHAEL K. KIRK

Attesting Officer

Acting Commissioner of Patents and Trademarks